Dec. 31, 1935. F. OLIVERO 2,025,888
GLASS CLEANER
Filed June 1, 1932 2 Sheets-Sheet 1
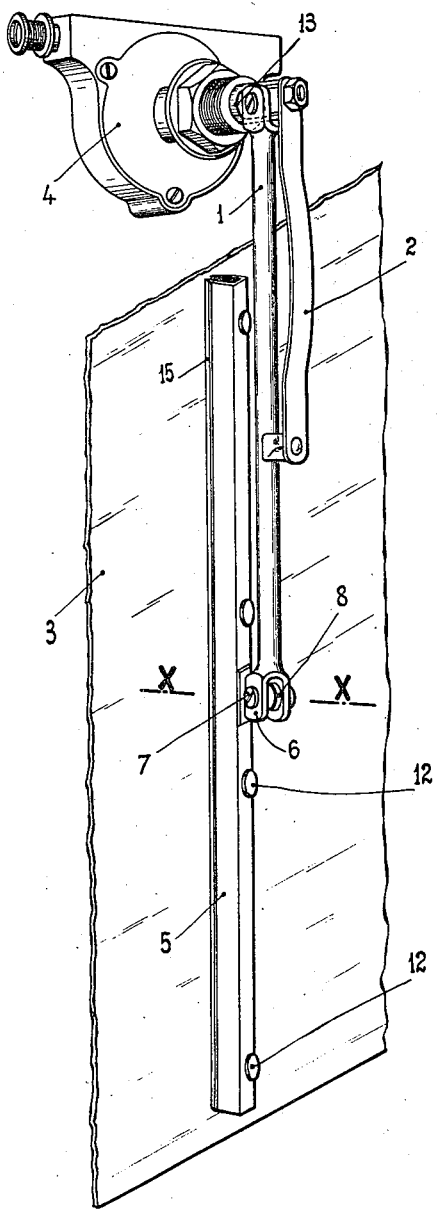
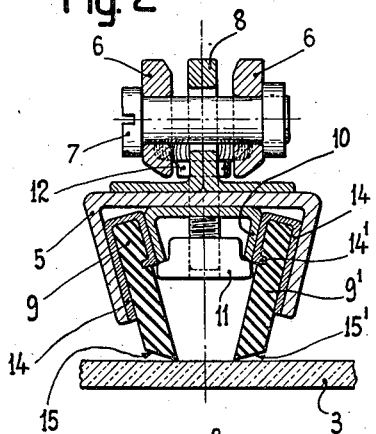
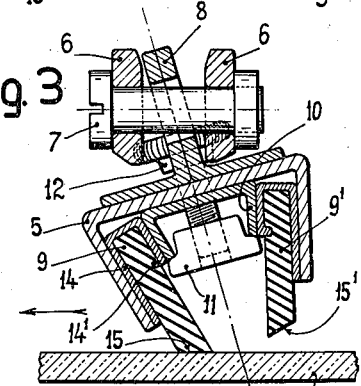
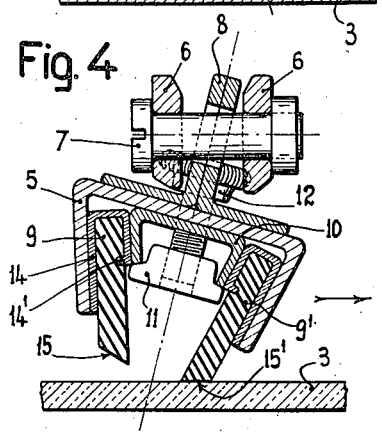
Inventor:
Fernando Olivero
By
Attorney.

Dec. 31, 1935.   F. OLIVERO   2,025,888
GLASS CLEANER
Filed June 1, 1932   2 Sheets-Sheet 2
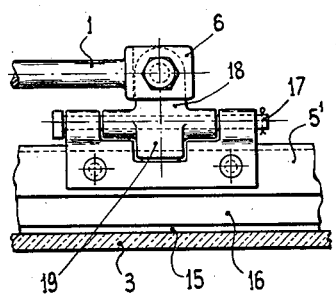
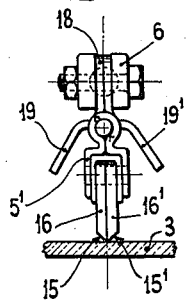
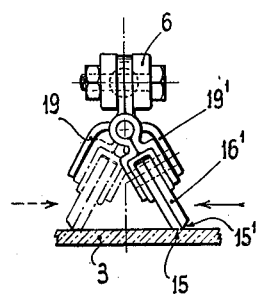
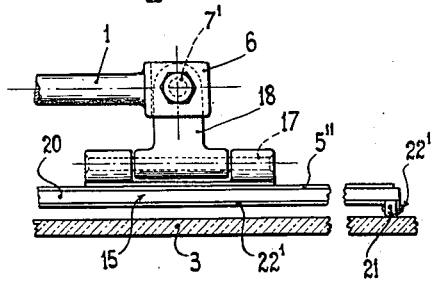
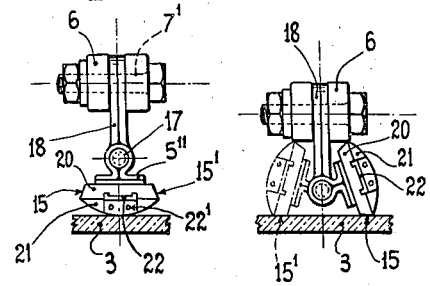
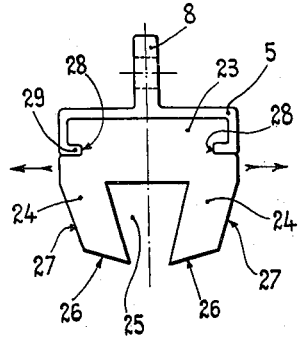
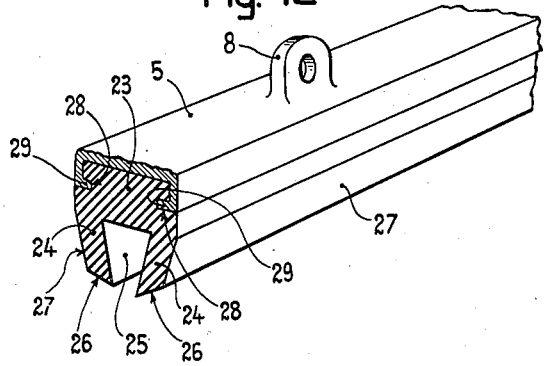
Inventor:
Fernando Olivero
By
Attorney Patented Dec. 31, 1935

2,025,888

UNITED STATES PATENT OFFICE 2,025,888

GLASS CLEANER

Fernando Olivero, Turin, Italy

Application June 1, 1932, Serial No. 614,828
In Italy June 19, 1931

4 Claims. (Cl. 15—250)

This invention relates to glass-cleaners used in vehicles to remove water drops, rain, snow and other impurities from glass panels on which they deposit.

It is known that the devices of this class are provided with a scraper which is driven with oscillatory or reciprocatory motion in contact with the glass. It is also known that to secure such an oscillatory or alternative motion without having to overcome too great a resistance, scrapers having a minimum thickness are used which are applied against the glass by means of a very weak pressure. In these conditions the action of the scraper is not satisfactory because it merely slides with one of its edges in contact with the glass surface without producing an efficient cleaning action.

The above stated objections are removed by the present invention in which the scraper contacts with the glass along a comparatively extensive surface which further is parallel with the glass surface, the operative scraper face being provided on the edge of a blade which is inclined rearwardly or in trailing position with respect to the direction of its motion.

The present invention also includes a scraper which comprises two operative faces each of which is capable of operating in the above stated manner in respect of the scraper motion in one direction, the position of the scraper being reversed at the end of each stroke for the purpose of securing the above stated useful conditions in respect of both directions of the scraper motion in contact with the glass surface.

On the annexed drawings are illustrated by way of example some embodiments of this invention and:

Figure 1 is a general perspective view of the glass cleaner;

Figure 2 is a fragmentary section on an enlarged scale on line X—X of Fig. 1 of a scraper in a condition of operation;

Figure 3 is a section similar to Fig. 2 of a scraper in a different condition of operation;

Figure 4 is a section similar to Figures 2 and 3 of a scraper in a further condition of operation.

Figure 5 is a fragmentary side view of a modified construction of scraper;

Figure 6 is an end view of Fig. 5 with the scraper in its intermediate position;

Figure 7 is an end view of Fig. 5 with said scraper in its alternative operative positions one of such positions being shown in dotted lines.

Figure 8 is a fragmentary side view of another embodiment of scraper;

Figure 9 is an end view of the scraper of Fig. 8 in its intermediate position;

Figure 10 is an end view similar to Fig. 9 with the scraper in two alternative operative positions one of which is shown in dotted lines;

Figure 11 is a transverse section to an enlarged scale of a further construction of scraper and Figure 12 is a perspective view of the scraper of Fig. 11 with its supporting member.

The gear of the glass cleaner intended to drive the operative scraper on the glass panel may be of any desired type and in the construction illustrated in Figure 1 it comprises an arm 1 mounted adjacent the glass 3 to be cleaned, said arm being forced against said glass by a spring 2 and being driven into oscillatory motion through a certain angle by and around shaft 13 supporting it. Said shaft 13 is driven by a gear enclosed within a casing 4 and adapted to be operated in any desired manner as by the suction of the vehicle engine, by electric means, by a handle, by a pedal and a flexible transmission and so on.

In the embodiment shown in Figures 2, 3 and 4, the scraper comprises a support bar 5 which is pivoted by means of an eye 8 solid with it on a pivot pin 7 engaged in the forked end 6 of arm 1, said bar 5 having a certain freedom for oscillation around an axis parallel with arm 1, that is parallel with the line of contact of the scraper with the glass.

For such a purpose in the construction illustrated the eye 8 of the bar 5 is mounted loosely on pivot 7 and intermediate the limbs of forked end 6 of arm 1.

The support bar 5 consists of a trapezoidal section member having its shorter side adjacent to glass 3, and on the internal face of each of its lateral flanges a blade 9, 9' of rubber or equivalent suitable material is located; said blades are held in position by means of an internal section member 10 and of pressure heads 11 which are tightened by means of screws 12. Each of said rubber blades 9, 9' is provided in its portion inside support bar 5 with a lining 14 whose internal edge ends in a rib 14' engaging the respective rubber blade. A large portion of the width of the internal face of each blade 9, 9' is left free by lining 14 and section member 10.

The faces 15, 15' of rubber blades 9, 9' which engage the glass panel 3 are cut to bevel edges in opposed directions as shown in Figures 2, 3 and 4, and thus the sharp edges of the two blades are opposite each other and each blade 9 or 9' is able to engage the glass surface by the flat surface of its face 15, 15'.

When the described glass cleaner is in inoperative position, both blades 9, 9' engage the glass 3 by their sharp edges under the action of spring 2 as illustrated by Figure 2, but on the arm 1 being driven in the direction of the arrow (Figure 3) the resistance found by the blade 9 which is in leading position causes the support bar 5 to oscillate around its support point on pin 7 the face 15 of said blade thus becoming in contact over its full area with the glass panel 3 on which it is driven by arm 1.

Under these conditions the rubber blade secures a very efficient action because its face 15 rubs heavily the region of the glass where it moves on and is forced by spring 2 and resiliency of said blade.

As soon as the direction of motion of arm 1 is reversed the scraper being driven in the direction of the arrow in Figure 4, the support 5 is caused to oscillate in the opposed direction and it carries the flat and inclined face 15' of the rubber blade 9' in contact with the glass as illustrated in Figure 4, while the sharp edge provided by operative face 15 and internal face of blade 9 is removed from the glass to prevent it from jamming thereon, such a jamming action when permitted being able to affect the scraper operation.

In the embodiment of Figures 5-7 the scraper consists of a rubber blade 16, 16' providing two faces 15, 15' which are inclined to each other and are adapted to come alternately in contact with the glass; the blade 16, 16' is carried by a section member 5' which is pivoted by means of the longitudinal hinge 17 on a link 18 which is itself pivoted in the fork head 6 of arm 1. Lugs 19, 19' projecting from link 18 restrict the oscillations of the scraper around its hinge 17. The scraper may consist of a single piece but it is preferably made of two blade sections 16, 16' located adjacent to each other either in contact with or separated from each other by a small interstice for the purpose of preserving their resilient character, each of said blades having a bevel edge 15, 15' and they being arranged to have their sharp edges back to back of each other.

The operation is similar to above described one, because during each stroke one of faces 15, 15' contacts with its full area with the glass, while the other one is spaced therefrom (Figure 7); on the stroke of the scraper on the glass being reversed said scraper reverses its position around hinge 17 from and into each other of the positions shown in Figure 6 owing to resistance each face 15 or 15' is subjected to when such face has its sharp edge in leading position; the scraper is thus always inclined in trailing position and the whole area of either of faces 15, 15' rubs on the glass.

In the construction of Figures 8, 9 and 10, the scraper comprises a blade 20 having a trapezoidal section to provide two inclined faces 15, 15'. Said blade is fastened on a bar 5" which in turn is pivoted on pivot 17 carried by a link 18 which is pivoted by pivot 7' on fork head 6 of arm 1; the faces 15 and 15' are thus converging towards the axis of the hinge pivot 17. On each end of the blade 20 a quadrant 21 is fastened on the same by means of a strip 22 fastened on said blade and having end lugs 22' on which quadrants 22 are secured; said quadrants are made of a material having a high friction coefficient, as rubber.

In operation, owing to friction of the rim of quadrants 21 on glass 3 at the time the scraper is starting its motion in either direction from the position of Figure 9, said scraper oscillates around hinge pivot 17 and applies on the glass 3 the one of its edge faces 15, 15' which is in trailing condition with respect to pivot 17 in oscillation around the centre of oscillation of arm 1 (shaft 13 in Figure 1) and said face is thus moved to rub on the glass (Figure 10). On the oscillatory stroke of arm 1 being reversed quadrants 21 are in leading condition with respect to direction of motion and owing to their friction on the glass the scraper reverses around pivot 17 and carries the other one of faces 15', 15 into rubbing contact with glass.

Figure 11 shows a scraper consisting of a section bar of rubber or similar suitable material which provides a connecting flange or bead 23 having grooves 28 by means of which it is engaged by hooked flanges 29 of a support bar 5 having the eye 8 for hinge connection with the arm 1 not shown.

Two blades 24 project integrally from bead 23 leaving an intermediate groove 25 and said blades converge towards the middle line of the section of the profile each of them providing a bevel face 26. Said faces 26 have a comparatively large area and they converge towards the middle line of the profile while providing an obtuse-angle edge with the outer surface 27 of the same blade.

When a scraper having the described profile is reciprocated on the glass by the scraper actuating gear (as 13, 1, 2 in Figure 1) in the direction of either of arrows in Fig. 11, owing to lost motion or play left in mounting the eye 8 of support bar 5 in the arm 1 (as described in connection with parts 6, 7, 8 in Figure 1) which enables the scraper to oscillate around an axis parallel with the center line of the scraper profile that is perpendicular to the plane of Figure 12, either of faces 26 (according to direction of travel) is caused to rub on the glass surface.

Said face 26 acts on the glass on a comparatively large area and under a pressure depending on the action of means carrying the scraper (as parts 1 and 2 in Figure 1) and on resiliency of blade 24 which is able of flexure towards the centre line of the scraper, and therefore it secures a very effective action thus actually scraping impurities instead of passing over them as it happens in connection with scrapers consisting of a thin blade; at the same time the other face 26 is removed from the glass owing to oscillation of the scraper and is prevented from jamming thereon and affecting the scraper operation.

The scraper profile may be different from that described and illustrated and it may merely provide two inclined and sufficiently extensive faces whose directions converge towards the centre line of the profile said faces being separated by a depression or a groove in register with the intersection of such faces.

The scraper consists in its preferred form of an integral rubber member having recesses 28 for engagement by side hooks 29 of support bar 5; if desired, said scraper may consist of a plurality of interconnected parts and it may be made of any suitable material.

Of course the present invention is capable of a number of different embodiments but in all constructions of the same a face of extensive area is caused to rub on the glass instead of a sharp edge as in known constructions, said face being provided on the edge of blades which are always inclined rearwardly or in trailing conditions with respect to direction of motion and which substitute automatically for each other to prevent sharp edges from moving in leading conditions over the glass and therefore any possible jamming of the scraper.

What I claim as my invention and desire to secure by United States Letters Patent is:—

1. A glass-cleaning scraper comprising a section bar made of rubber-like resilient material, the width and depth of said bar being substantially equal, said bar having an intermediate longitudinally extending groove in one side thereof to form two spaced blades having flat operative bevel glass-engaging outer faces converging outwardly with respect to the middle line of said section bar and forming an obtuse angle with the respective adjacent outer blade faces lying on the side contour of said section bar.

2. A glass-cleaning scraper comprising a section bar made of rubber-like resilient material, the width and depth of said bar being substantially equal, said bar having an intermediate longitudinally extending groove in one side thereof to form two spaced blades having flat operative bevel glass-engaging outer faces converging outwardly with respect to the middle line of said section bar and forming an obtuse angle with the respective adjacent outer blade faces lying on the side contour of said section bar, a reciprocating arm mounted to sweep across the glass to be cleaned, means for rockably mounting said section bar on said arms to provide for rocking of said bar about an axis extending longitudinally of said bar, and means for limiting the rocking movement of said bar to positions at which said bevel blade faces respectively are parallel to the glass surface.

3. A glass cleaner for windshields and the like, comprising a rigid support, means for moving said support over the glass to be cleaned, means for rockably mounting said support on said moving means to provide limited rocking of said support, two parallel and spaced blades of soft material mounted on said support to be carried alternatively in contact with the surface to be cleaned and each having a longitudinal face adapted to act on said surface, said face of each blade being extensive and uninterrupted and being confined by an obtuse edge on its side which is forward during reciprocation of said support and by a sharp edge on its rear side, the ratio of the thickness of said blades to the depth thereof being high enough so that under normal wiping pressure the projecting part of the blades will remain in an unflexed condition to retain the full wiping surface of the blades in contact with the glass.

4. A glass cleaner for windshields and the like, comprising a rigid support, means for moving said support over the glass to be cleaned, means for rockably mounting said support on said moving means to provide limited rocking of said support, a scraper mounted in said support and formed of a bar of soft material with two blades separated by an intermediate groove and each having a longitudinal face adapted to act on the surface of the glass, said face of each blade being extensive and uninterrupted and being confined by an obtuse edge on its side which is forward during reciprocation of said support and by a sharp edge on its rear side, the width and depth of said bar being substantially equal, whereby under normal wiping pressure the projecting part of the blades will remain in an unflexed condition to retain the full wiping surface of the blades in contact with the glass.

FERNANDO OLIVERO.